United States Patent Office 3,109,445
Patented Nov. 5, 1963

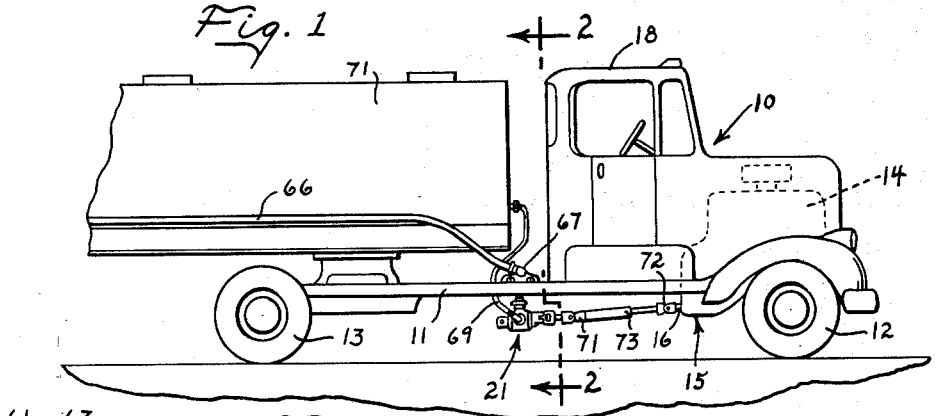

3,109,445
TRUCK PUMPING APPARATUS
John D. Holmes, Jr., Westfield, N.J., assignor to Roper Hydraulics, Inc., Commerce, Ga., a corporation of Georgia
Filed Oct. 12, 1960, Ser. No. 62,210
3 Claims. (Cl. 137—354)

This invention relates to improvements in pumping apparatus and particularly to a pump apparatus for use on a truck.

An important object of this invention is to provide a pumping apparatus which can be readily mounted on conventional trucks to be driven from the truck power take-off without requiring any modification in the construction of the truck.

Another object of this invention is to provide a pumping apparatus in accordance with the foregoing object in which the pump mounting bracket provides fluid connection between the pump and a pair of lateral outlets located at opposite sides of the truck to thereby facilitate connection of the pump to fluid delivery conduits at either side of the truck.

Still another object of this invention is to provide a pumping apparatus which is of simple construction and which can be economically fabricated and assembled.

These, together with various ancillary objects and advantages of this invention will be more readily appreciated as the same becomes better understood by reference to the following detailed description when taken in connection with the accompanying drawings wherein:

FIGURE 1 is a fragmentary side elevational view of a truck having the pumping apparatus of the present invention mounted thereon;

FIG. 2 is a fragmentary transverse sectional view taken on the plane 2—2 of FIGURE 1 and illustrating the pumping apparatus and the arrangement for mounting the same;

FIG. 3 is an end elevational view of the pumping apparatus and mounting bracket; and FIG. 4 is a sectional view through the pump taken on the plane 4—4 of FIG. 3.

The pumping apparatus of the present invention is specifically designed for use on trucks having a liquid reservoir to pump liquid into or out of the reservoir. The term "trucks," as used herein is intended to cover trucks in which the reservoir is mounted on the main truck body, as well as trucks having separable tractor and trailer units as shown in FIG. 1. As is conventional, the trucks include a main support frame having spaced side members or rails 11 which extend longitudinally of the truck and ground-engaging wheels 12 and 13 mounted by springs (not shown) adjacent the forward and rear ends of the frame to support the latter in spaced relation to the ground. An engine 14 is mounted on the frame adjacent its forward end and has a power take-off transmission 15 located between the side members 11 of the chassis for selectively driving a power take-off shaft 16.

It is the common practice to outfit a truck with a tank or tank trailer respectively for hauling liquids part of the time and to change the truck body or truck trailer to haul different commodities at a different time. Thus, trucks are frequently employed for delivering fuel oil during the winter months, and the same truck converted during the summer months, by using a different body or trailer, to enable transportation of non-liquid materials. The pumping apparatus of the present invention is arranged so as to enable mounting and demounting of the pumping apparatus from trucks without requiring any change in the construction of the truck. In practice, the spacing between the side members 11 of the trucks varies only slightly between different models and makes of trucks, and the pumping apparatus 21 of the present invention is designed for mounting on the side members 11 at a point rearwardly of the cab 18 of the truck. The pumping apparatus 21 includes a pump 22, herein shown of the rotary gear type, and having a drive shaft 23. The pump includes a casing 24 defining intersecting pump chambers having intermeshing gear elements 25 and 26 therein. The casing has a first port 27 located at one side of the mesh point of the gears and a second port 28 located at the other side. The drive shaft 23 is operatively connected to one of the gears such as 25 and the other gear is rotatably supported on an idler shaft 29. For reasons set forth hereinafter, one port such as 27 communicates through a passage 31 with a side opening having a flange 32 disposed therearound. The other port 28 communicates through a passage 33 with an end opening 34 having a flange 35 disposed therearound. The flanges 32 and 35 are positioned in relatively perpendicular planes with the flange 32 parallelling a plane through the shafts 23 and 29, and the flange 35 disposed perpendicular to the last-mentioned plane. Advantageously, the space between the face of the flange 32 and the shaft 23 is preferably made substantially the same as the distance between the face of the flange 35 and the shaft 23.

The pump is mounted upon the side members 11 by means of a generally T-shaped bracket formed of pipes or tubes. In the form shown, the bracket is formed in section which are welded together to form the rigid T-shaped bracket and includes a T-fitting 41 having pipe sections 42 and 43 welded to opposite ends to form the main leg of the T-shaped bracket. As will be noted, a longitudinal axis of the sections 42 and 43 are inclined downwardly and inwardly relatively to each other to facilitate draining of the liquid back to the T-fitting 41. A depending pipe section 44 is attached to the central leg of the fitting 41 and extends downwardly therefrom to form the other leg of the T-shaped bracket. A mounting flange 45 is attached through a neck section 46 to the lower end of the depending section 44. The sections 42 and 43 of the mounting bracket are attached to the spaced side members 11 by saddles 48 and 49. The saddles are rigidly secured as by welding to the respective pipe sections and are detachably connected by fasteners 51 to the side members. The bracket extends between the side members and supports the pump 21 at a point located between and somewhat below the side members as best shown in FIG. 2. The pump flanges 32 and 35 are preferably similarly shaped and are formed with bolt openings 53 and 54 respectively which are arranged to register with the bolt openings 55 in the mounting flange 45. In the embodiment shown, the end flange 35 is attached to the mounting flange of the bracket and bolts 56 extend through the openings 55 and 54 to detachably secure the pump to the bracket. An O-ring 58 is disposed in a groove 59 in one of the flanges, herein shown in the flange 45, to seal the interface therebetween while permitting limited relative shifting between the mounting flange 46 and the pump flange 35 for purposes of alignment of the pump drive shaft. As is apparent from FIGS. 2 and 4, mounting of the pump on the bracket flange communicates one of the ports such as 28 with the tubular bracket so as to thereby provide a pair of fluid outlets designated 61 and 62 located at opposite ends of the bracket and at relatively opposite sides of the truck. The ends of the sections 42 and 43 are threaded as indicated at 63 and 64 to enable connection of the pump to a delivery conduit at either side of the truck. As they are shown in FIG. 1, a delivery conduit 66 is connected through a fitting 67 to the threaded end 63 of the pump mounting bracket. A similar conduit (not shown) may be provided at the other end of the bracket, or, alternatively, the other end may be closed as by a removable cap. The other pump port 27 is connected through a flanged fitting 68 (FIG. 4) to a conduit 69 leading to the truck reservoir 71.

The pump drive shaft 23 is connected to a pair of conventional universal joints 71 and 72 and a slip joint 73 to the power take-off shaft 16 to be driven thereby. The several universal joints and the slip joint accommodate a wide variation in the relative positions of the pump drive shaft and the pilot take-off shaft so as to adapt the pump for use on different trucks. However, in some installations, it is desirable to shift the position of the pump drive shaft 23 in order to provide additional clearance. For this purpose, it is contemplated that the drive shaft may be connected to either one of the gears 25 or 26 and the pump may be mounted with either of the flanges 32 or 35 on the pump mounting brackets. As shown in FIG. 2, the end bell 24a of the pump casing is designed so that it may be assembled on the main casing in either of two positions, 180 degrees apart to enable driving of either one of the gears 25 or 26. Thus, when the pump is mounted with the end flange 35 on the bracket flange 45 as shown in the drawings, connecting of the pump drive shaft to either the upper gear element 25 or the lower gear element 26 will enable some vertical adjustment of the drive shaft. Alternatively, when the pump is mounted with the flange 32 on the bracket flange 45, reversal of the position of the drive shaft 23 enables some lateral shifting of the drive shaft in a direction crosswise of the side members of the truck. A pressure relief valve 81 is herein shown formed in the other end bell 24b of the housing. It is also contemplated that this end bell be shaped so as to enable the same to be assembled on the main pump casing in either of two positions 180 degrees apart so that the relief valve can be positioned to function when either one of the ports 27 or 28 of the pump is utilized as the outlet port.

From the foregoing it is thought that the operation and construction of the pumping apparatus will be readily understood. As is apparent, the assembly of the pump 21 and mounting bracket may be readily mounted on the side members of the truck frame to not only support the pump thereon but to also provide spaced fluid outlets one at each side of the truck. Since the spacing between the side members 11 of the truck frame is substantially uniform for different trucks, the unit can be mounted on a wide variety of trucks without modification in the truck construction. Moreover, the pump is designed to provide some adjustment of the position of the pump drive shaft so as to accommodate different trucks in which the location of the power take-off may be different.

I claim:

1. In combination with a truck chassis comprising spaced side frame members, a cab mounted on said side frame members, and an engine mounted on said side frame members and having a power take-off shaft extending below the cab to a point rearwardly thereof; a fluid pump including a casing having first and second fluid ports, impeller means operative when rotated in one direction to pump fluid from the first port to the second port and operative when rotated in the other direction to pump fluid from the second port to the first port, and a drive shaft connected to one of the impeller means, first and second like pump flanges on pump around said first and second ports disposed in relatively perpendicular planes generally paralleling said drive shaft, a generally T-shaped pump suspension and fluid conducting bracket forming the sole support for the pump and having a first tubular leg dimensioned longer than the space between said side frame members and extending crosswise therebetween and a depending tubular leg communicating with said first leg intermediate the ends thereof and extending downwardly between said side frame members, first and second brackets rigidly secured to said first tubular leg adjacent opposite ends thereof and at relatively opposite sides of the depending leg, means detachably mounting said first and second brackets on said side frame members at a point rearwardly of the cab for supporting the T-shaped bracket on the truck chassis, a mounting flange on the lower end of said depending leg shaped to mate with either of said pump flanges, fasteners detachably connecting said mounting flange to one of the pump flanges for supporting the pump on the T-shaped bracket with one of the ports in communication with said depending leg, means operatively connecting said pump drive shaft to said power take-off shaft, said T-shaped bracket providing lateral discharge outlets at opposite ends of said first leg adjacent each side of the truck chassis, and coupling means at each end of said first leg for connecting a fluid conduit thereto to enable delivery of fluid at either side of the truck chassis.

2. In combination with a truck chassis including spaced side frame members, a cab mounted on said side frame members, and an engine mounted on said side frame members and having a power take-off shaft extending below the cab to a point rearwardly thereof; a fluid pump having a drive shaft and first and second fluid ports, said pump including impeller means operative when rotated in one direction to pump fluid from the first port to the second port and operative when rotated in the other direction to pump fluid from the second port to the first port, first and second like pump flanges on the pump around the first and second ports disposed in relatively perpendicular planes generally paralleling said drive shaft, a generally T-shaped pump suspension and fluid conducting bracket forming the sole support for the pump and having a first tubular leg dimensioned longer than the space between said side frame members and extending crosswise therebetween and a depending tubular leg communicating with said first leg and extending downwardly between said side frame members, first and second brackets rigidly secured to said first tubular leg adjacent opposite ends thereof, means detachably mounting said first and second brackets on said side frame members at a point rearwardly of the cab for supporting the T-shaped bracket on the truck chassis, said depending leg being located relatively closer to one of said brackets than to the other of said brackets to extend downwardly at a point laterally offset from the centerline of the truck chassis, said first tubular leg including end sections sloping downwardly to a point adjacent said depending leg to facilitate drain back, a mounting flange on the lower end of said depending leg shaped to mate with either of said pump flanges, fasteners detachably connecting said mounting flange to one of the pump flanges for supporting the pump on the T-shaped bracket with one of the ports in communication with said depending leg, means operatively connecting said pump drive shaft to said power take-off shaft, said T-shaped bracket providing lateral discharge outlets at opposite ends of said first leg adjacent each side of the truck chassis, and coupling means at each end of said first leg for connecting a fluid conduit thereto to enable delivery of fluid at either side of the truck chassis.

3. The combination of claim 1 wherein said impeller means of said pump includes first and second intermeshing gears, the axes of which lie in a plane generally parallel to one of the pump flanges and generally perpendicular to the other of the pump flanges, said pump casing means including a body enclosing said gears and at least one removable end bell overlying the ends of the gears and having bearing means supporting said drive shaft, said end bell being mountable on the body with the drive shaft engaging either of the first or the second gear.

References Cited in the file of this patent
UNITED STATES PATENTS

| | | |
|---|---|---|
| 1,433,713 | Fricker | Oct. 31, 1922 |
| 1,644,090 | Sawyer | Oct. 4, 1927 |
| 1,755,376 | Thompson | Apr. 22, 1930 |
| 1,761,723 | Greer | June 3, 1930 |
| 1,825,775 | Brubaker | Oct. 6, 1931 |
| 2,784,747 | Weempe | Mar. 27, 1957 |